United States Patent [19]
Rodgers

[11] Patent Number: 5,249,391
[45] Date of Patent: Oct. 5, 1993

[54] TREE INJECTION DEVICE

[75] Inventor: James A. Rodgers, Orchard Park, N.Y.

[73] Assignee: Omala Inc., Cheektowaga, N.Y.

[21] Appl. No.: 746,930

[22] Filed: Aug. 19, 1991

[51] Int. Cl.⁵ .............................. A01G 29/00
[52] U.S. Cl. .................................. 47/57.5
[58] Field of Search ...................... 47/57.5, 48.5

[56]  References Cited
   U.S. PATENT DOCUMENTS

| | | | |
|---|---|---|---|
| 2,894,509 | 7/1959 | Bednarz | 128/218 |
| 3,124,904 | 3/1964 | Mauget | 47/57.5 |
| 3,286,401 | 11/1966 | Mauget | 47/57.5 |
| 3,304,655 | 2/1967 | Mauget | 47/57.5 |
| 3,576,276 | 4/1971 | Clarke | 47/57.5 |
| 4,084,588 | 4/1978 | Koenig | 128/218 R |
| 4,103,456 | 8/1978 | Hendrixson et al. | 47/57.5 |
| 4,365,440 | 12/1982 | Lenardson | 47/57.5 |
| 4,596,088 | 6/1986 | Graber | 47/57.5 |
| 4,648,532 | 3/1987 | Green | 222/82 |
| 4,989,366 | 2/1991 | DeVlieger | 47/57.5 |

Primary Examiner—Henry E. Raduazo
Attorney, Agent, or Firm—Bean, Kauffman & Spencer

[57]  ABSTRACT

A device for injecting a liquid composition into a plant includes a pair of telescopically associated container sections cooperating to define an interior space whose volume is varied incident to relative axial movement of the sections between extended and contracted positions for purposes of expelling liquid therefrom into a plant through a liquid discharge tube connected to one of the sections, characterized in that the interior space may be selectively employed to store a single liquid chemical composition or divided into separate volumes for storing dissimilar liquid and liquid or solid chemical compositions, which may be mixed within the device immediately prior to injection thereof into a plant.

17 Claims, 2 Drawing Sheets

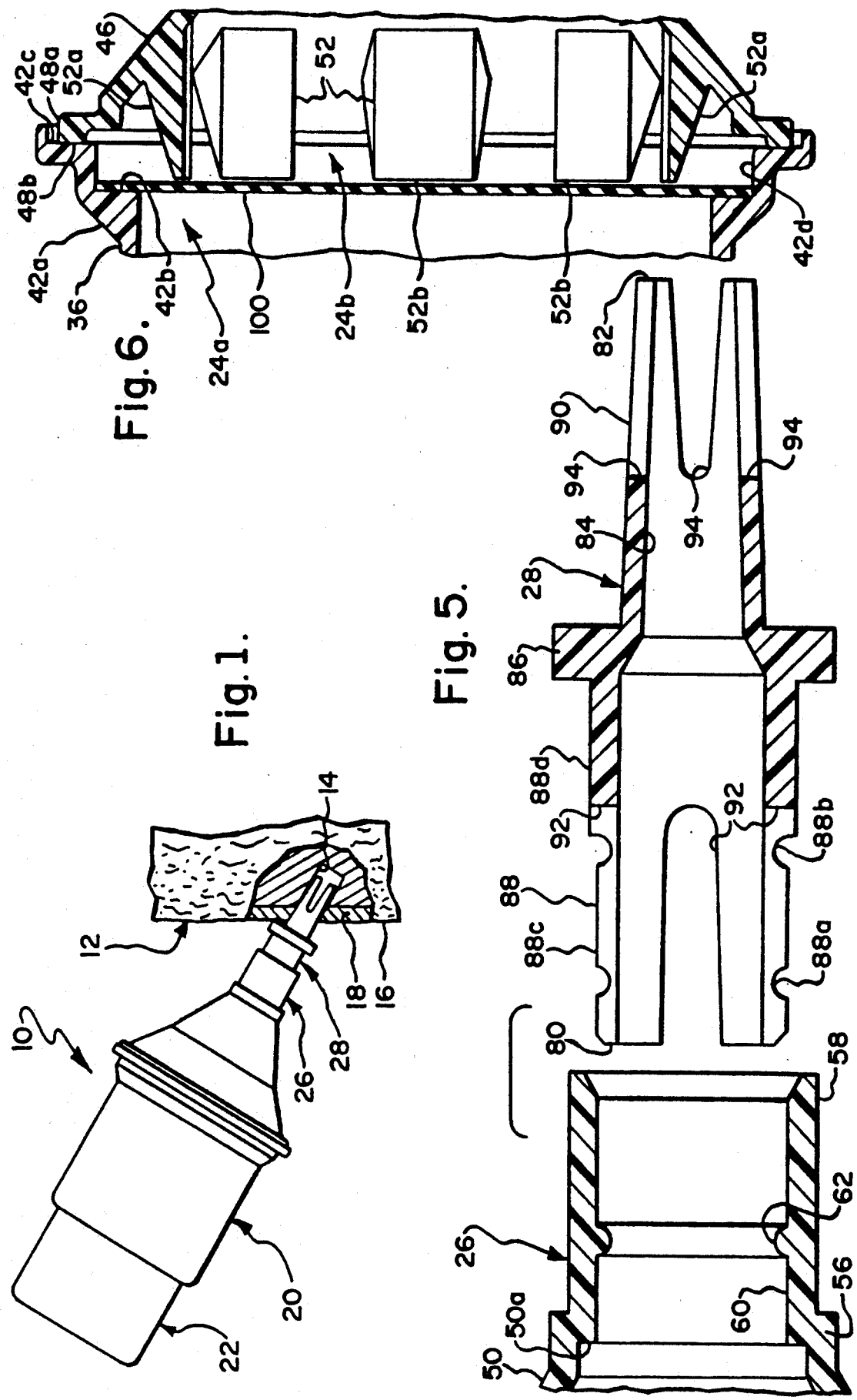

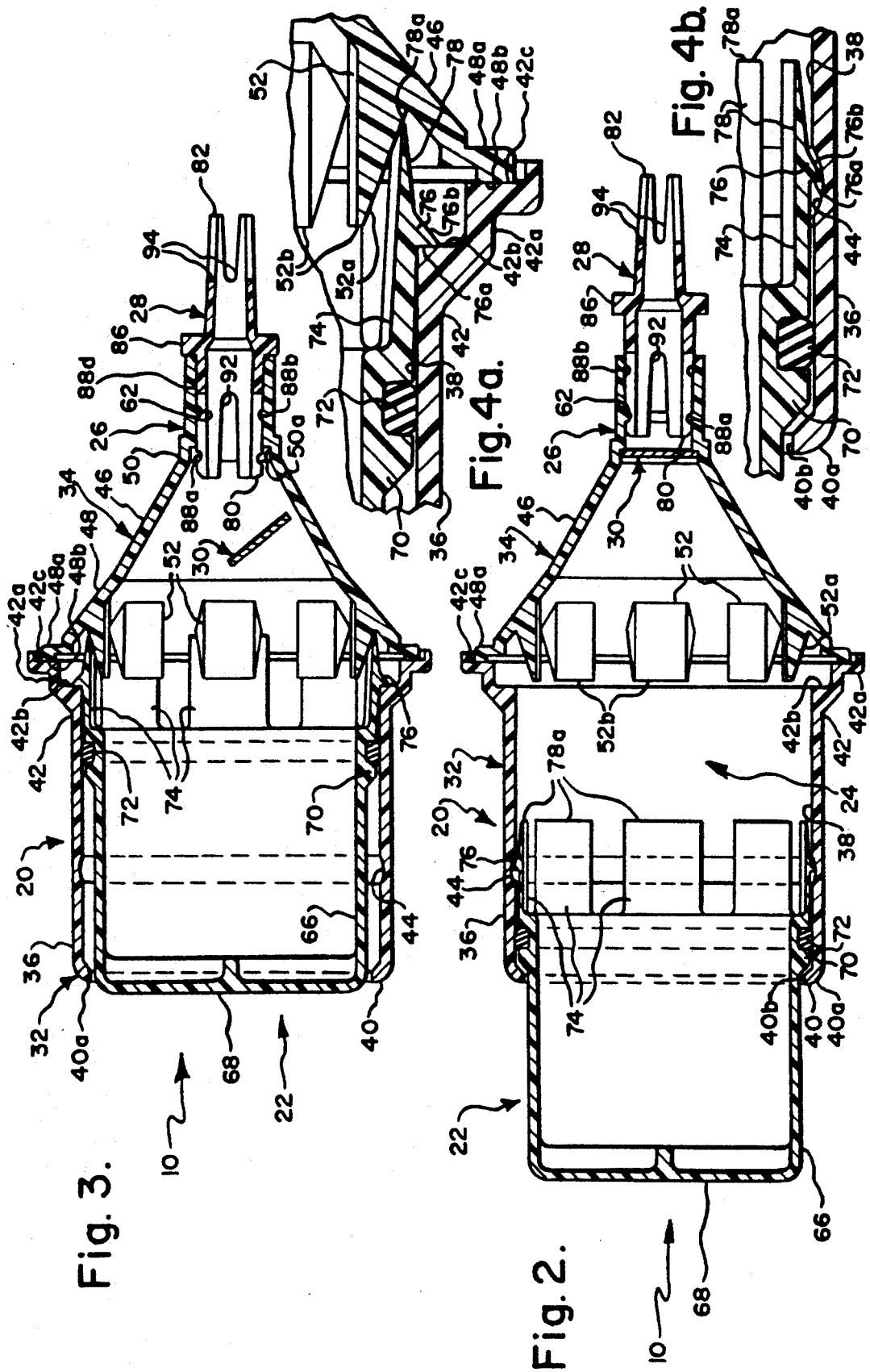

TREE INJECTION DEVICE

BACKGROUND OF THE INVENTION

The general invention relates to devices for injecting plants, such as trees, with liquids adapted for instance to promote or control growth, prevent or treat disease and control insects.

It has heretofore been disclosed for example in U.S. Pat. Nos. 3,286,401 and 4,365,440 to provide a tree injection device defined by a pair of telescopically associated container sections cooperating to define a liquid and gas receiving space whose volume is varied by relative axial movement of the sections between extended and contracted positions, wherein a liquid discharge passageway formed in one of the sections is normally closed by a frangible diaphragm. A separately formed liquid discharge tube is adapted to be inserted within a pre-formed bore opening provided in a tree and within the discharge passageway for purposes of rupturing the diaphragm to permit injection of liquid into the bore opening. In these devices, latch devices are provided to retain the sections in their contracted position.

SUMMARY OF THE INVENTION

The present invention relates to improvements in tree injection devices and more particularly to improvements in devices of the type having telescopically associated container sections cooperating to define a liquid receiving interior space whose volume is varied by relative axial movement of the sections, between extended and contracted positions, a liquid discharge tube through which liquid is passed from the space to a point of injection and a frangible sealing member for normally blocking escape of liquid from the space until a tree injection operation is to be performed.

In accordance with the invention, a liquid discharge tube is slidably carried by a guide tube defined by one of the sections for movement between an extended device charged position and a device dispensing position incident to which rupture of the sealing member is effected. The guide tube and discharge tube are sized and shaped to facilitate movement of the discharge tube into its device dispensing position, wherein it becomes liquid sealed relative to the guide tube and resists being pulled from within the guide tube incident to withdrawal of the dishcarge tube from a tree at the completion of an injection operation.

The invention includes an improved latching arranged for retaining the container sections in their contracted position including a resiliently deformable latch device on one of the container sections, a latch surface on the other of the container sections, wherein the latter additionally includes cam means engageable with the latch device for supplementing the resilient bias of the latch device in positioning the latch device in engagement with the latch surface.

In accordance with the invention, the interior space defined by the container sections may be selectively divided into separate volumes for storing dissimilar liquid and liquid or solid chemical compositions by a seal adapted to be ruptured by piercing means carried by the latch device. In this arrangement, the piercing means cooperates with the cam means carried by the other of the container sections to create and/or enlarge openings formed in the seal by the piercing means in order to facilitate mixing of the liquid and liquid or solid chemical compositions prior to discharge thereof through the discharge tube.

BRIEF DESCRIPTION OF THE DRAWINGS

The nature and mode of operation of the present invention will now be more fully described in the following detailed description taken with the accompanying drawings wherein:

FIG. 1 is a view showing the plant injection device of the present invention partially inserted within a plant;

FIG. 2 is an enlarged longitudinal sectional view of the device shown in FIG. 1;

FIG. 3 is a view similar to FIG. 2, but showing the device in contracted position;

FIGS. 4a and 4b are enlarged cross-sectional views showing positions assumed by a latch of the device;

FIG. 5 is an enlarged, exploded view of the guide and discharge tubes; and

FIG. 6 is an enlarged sectional view taken centrally through the outer container section of the device showing an interior spaced seal installed.

DETAILED DESCRIPTION

A plant injection device constructed in accordance with a preferred form of the present invention is generally designated as 10 in the drawings. Device 10 is intended for use in injecting a desired liquid, such as for example may include compositions or chemicals to promote or control growth, prevent or treat disease and combat insects, into a desired plant, such as a tree 12. Injection is facilitated by providing tree 12 with a preformed bore 14 of given size, which extends through an outer surface thereof 16 defined for instance by bark 18. The diameter of bore 14 will be determined by the size of device 10, whereas the length or depth of the bore will be determined both by the size of the device and the structural characteristics of the tree including the thickness of its bark, as is well understood in the tree injection art.

Device 10 is shown in the drawings as generally including a pair of telescopically associated first or outer and second or inner container sections 20 and 22, which cooperate to define an interior space 24 whose volume is varied by effecting relative axial movement of the sections between extended or device charged and contracted or device expelling positions shown in FIGS. 2 and 3, respectively; a guide tube 26 carried by section 20; a discharge tube 28 carried by the guide tube; and a seal member 30 carried by section 20 for normally blocking passage of liquid from space 24 outwardly through the discharge tube. In accordance with one intended use of device 10, space 24 is initially occupied by a quantity or charge of a desired liquid, not shown, intended to be injected into tree 12, together with a quantity of a compatible gas, such as air, also not shown, which serves to pressurize the liquid, during an expelling operation, and assist in injection of the liquid into tree 12 in the manner to be described. The various components of device 10 may be fabricated of any desired material, but are preferably mold formed from a suitable plastic material(s) resistant to the types of chemicals with which the device is intended to be charged and of sufficient strength to withstand forces to be applied thereto during an injection operation to be described.

Container section 20 is shown as including separately formed open end and opposite end portions 32 and 34.

Open end portion 32 is best shown in FIGS. 2 and 3 as including a generally cylindrical side wall 36 defining an inner bearing surface 38; a first open end 40 defined by a rim 40a, which extends radially inwardly of side wall 36 and bounds an opening 40b; and a second open end 42 defined by a rim 42a, which extends radially outwardly of side wall 36 and bounds an annular latch surface 42b and an outer annular mounting surface 42c. Preferably, bearing surface 38 is of cylindrical configuration and surfaces 42b and 42c lie in parallel planes disposed normal to the such bearing surface. It is also preferable to provide bearing surface 38 with a radially inwardly opening annular recess 44, which is arranged relatively adjacent to first open end 40.

Opposite end portion 34 is also best shown in FIGS. 2 and 3 as including a generally frusto-conically shaped side wall 46; a first open end 48 defined by a rim 48a, which extends radially outwardly of the relatively large end of side wall 46 and bounds an annular mounting surface 48b; and a second open end 50 which connects the relatively small end of side wall 46 to guide tube 26 and bounds an annular seat 50a for mounting seal member 30. As desired, seal member 30 may be temporarily retained within seat 50a, such as by friction or a frangible adhesive. Alternatively, seal member 30 may be in the form of a thin frangible web formed integrally with second open end 50.

In the presently preferred form of the invention, opposite end portion 34 is formed with a plurality of cam surface members 52, which project inwardly of side wall 46 and are arranged in an annularly spaced relationship. Members 52 define cam surfaces 52a, which face outwardly and generally towards latch surface 42b, when mounting surfaces 42c and 48b are joined in the manner to be described to assembly outer container section 20. As best shown in FIGS. 4a and 4b, cam surfaces 52a terminate in free edges 52b, which are arranged radially inwardly of latch surface 42b and axially intermediate the latch surface and mounting surface 42c when outer container section 20 is in assembled condition.

Guide tube 26 is best shown in FIG. 5 as having an inner end 56, an outer end 58 and an inwardly facing cylindrical guide surface 60 from which projects an annular rib 62.

Inner container section 22 is shown in FIGS. 2 and 3 as including a generally cylindrical side wall 66, an end wall 68 joined to one end of the side wall to close one end of section 22 and an annular rim portion 70 joined to an opposite end of the side wall. As best shown in FIGS. 2 and 4b, rim portion 70 cooperates with rim 40a to define the extended position of container sections 20 and 22, and carries a suitable sealing device, such as an O-ring type seal 72, arranged to slidingly seal against bearing surface 38 and sized relative to recess 44 to provide a continuous seal with the bearing surface incident to movement of container sections 20 and 22 between their extended and contracted positions.

Rim portion 70 additionally supports a plurality of annularly spaced latch members 74, which define radially outwardly projected latching elements 76 formed with radially disposed and rearwardly facing latch surfaces 76a and inclined and forwardly facing cam surfaces 76b and forwardly projecting and tapering piercing elements 78 terminating in free cam/piercing edges 78a. As will be apparent from viewing FIGS. 3 and 4a, latching elements 76 are adapted to latch or lock container sections 20 and 22 in their contracted position, due to engagement of cam surfaces 76a with latch surface 42b, whereas engagement of cam surfaces 52a with elements 78 prevent subsequent separating movement of surfaces 76a relative to latch surface 42b, which might otherwise occur if pulling force were to be applied to container sections 20 and 22 in an amount sufficient to effect resilient deformation of latch members 74.

In the presently preferred construction, latch members 74, as is whole of section 22, are formed of resiliently deformable molded plastic material, and tend to assume a non-deformed configuration shown in FIG. 4a. Thus, when latching elements 76 are forced to move from within the confines of recess 44, as an incident to displacement of sections 20 and 22 from their extended position, bearing surface 38 causes the latching elements to deform radially inwardly to create a bias tending to return the latching elements to their non-deformed condition upon movement of latch surface 76a beyond latch surface 42b. Various plastic materials, which may be used in fabricating container section 22, tend to be subject to setting in a resiliently deformed state when maintained therein for periods of time corresponding to shelf lives of liquids which it may be desired to dispense. Thus, when section 22 is fabricated from resiliently deformable plastic materials of this type, it is desirable to provide recess 44 in order to insure that the bias introduced into such materials by deforming engagement of bearing surface 38 with latching elements 76 is fully available to force the latching elements outwardly for latching engagement with latch surface 42b. The provision of cam surface member 52 in combination with piercing elements 78 to positively force latching elements 76 outwardly for latching proposes may in certain cases avoid the need for providing recess 44 and/or employing a plastic material having a substantial degree of resiliency.

Discharge tube 28 is formed of a resiliently deformable material and is best shown in FIG. 5 as generally having liquid intake end 80; a liquid discharge end 82; a flow passageway 84 opening through ends 80 and 82; an annular radially extending abutment flange 86; an outer guide surface portion 88 extending between flange 86 and intake end 80 and an outer sealing surface portion 90 extending between flange 86 and discharge end 82. Guide surface portion 88 is formed to define first and second annular, radially outwardly facing retaining recesses 88a and 88b sized to alternatively snap fit receive annular rib 62 to define device changed and dispensing positions of discharge tube 28 shown in FIGS. 2 and 3, respectively; a first outer guide surface 88c, which extends between intake end 80 and second retaining recess 88b; and a second outer guide surface 88d, which extends between the second retaining recess and flange 86. Abutment flange 86 serves to limit insertion of discharge tube 28 within guide tube 26 beyond its device dispensing position, as well as limit the extent to which the discharge tube can be inserted into bore 14 formed in tree 12. A plurality of slots 92 are provided to extend radially between guide surface portion 88 and flow passageway 84 from intake end 80 to a point adjacent second retaining recess 88b, and a second plurality of slots 94 are provided to extend radially between outer sealing surface 90 and the flow passage. Slots 92 facilitate flexure tube 28 in order to permit slidable insertion thereof within guide tube 26 to initially assume its device charged position with a minimum amount of force, and subsequently during a dispensing operation to provide for free and unobstructed flow of liquid into passageway 84. Slots 94 provide for unobstructed discharge of liquid from passageway 84 into a tree to be treated. Preferably, the diameter of first outer guide surface 88c is equal to or less than the diameter of tube guide surface 60; the diameter of second outer guide surface 88d is slightly greater than the diameter of the tube guide surface, so as to provide for an interference fit therebetween; retaining recess 88b has a diameter slightly larger than retaining recess 88a; and outer sealing surface portion 90 is slightly tapered in a direction towards discharge end 82.

Device 10, as thus far described, is assembled by creating a first subassembly comprising end portion 34, sealing member 30 and discharge tube 28 and a second subassembly comprising end portion 32 and container section 22. The first subassembly is formed by inserting seal member 30 within seat 50a and discharge tube 28 within guide tube 26 to arrange these parts in the manner shown in FIG. 2. A second subassembly is formed by slidably inserting container section 22 within end portion 32 until these parts assume their relative positions shown in FIG. 2; it being necessary to deform latch members 74 sufficiently to permit latch surfaces 76a to clear latch surface 42b. Thereafter, the second subassembly is manipulated such that space 24 opens upwardly, a charge of desired liquid is poured into such space, and the subassemblies permanently fixed together, such as by bonding mounting surfaces 42c and 48b to one another by a friction or sonic welding techniques or by a suitable adhesive or solvent. When device 10 is assembled, the charge of liquid and gas, such as air, are fluid sealed within space 24. Typically, a charge of liquid would occupy less than about one third of the total volume of space 24 when device 10 is fully assembled as viewed in FIG. 2, but the volume of the charge is a matter of choice, so long as there is sufficient gas to exert expulsion pressure on the charge and prevent the formation of subatmospheric pressure in space 24, which might otherwise occur as liquid is discharged therefrom. Device 10 tends to remain in its condition shown in FIG. 2, during storage and under normal handling conditions, due to frictional and internal pressure forces tending to oppose relative converging axial movement of sections 20 and 22 and due to the temporary latch provided by receipt of rib 62 within recess 88a.

When it is desired to inject liquid from device 10 into tree 12, bore opening 14 is first formed such as by a drilling operation with care being exercised to ensure that its axial length at least equals and preferably exceeds the axial length of sealing surface portion 90 of discharge tube 28, and that its diameter is smaller than the maximum diameter of the sealing surface by an amount sufficient to ensure that the discharge tube may be firmly frictionally retained or wedged within the bore opening when forced axially thereinto. After forming of bore opening 14, a user may partially insert discharge tube end 82 into the bore opening and then apply sufficient force to end wall 68 to cause container sections 20 and 22 to move into their contracted position, discharge tube 28 to slide within guide tube 26 into its device dispensing position and sealing surface 90 to slide into the bore opening to a depth limited by engagement of abutment flange 86 with outer surface 16 of bark 18. As an incident to movement of discharge tube 28 into its device discharge position, liquid inlet end 80 engages with and effects rupture of sealing member 30, as by forcing same from its sealed position within seat 50a. Alternatively, sections 20 and 22 may be manually moved into their contracted position and then sufficient force separately applied to end wall 68 and or rim 42a, as required to drive discharge tube 28 into tree 12 and into its device dispensing position. If the force required to drive the discharge tube is applied to the end wall, the sections will tend to move slightly beyond their contracted position into a further contracted position defined by engagement of edges 78a with the juncture of cam surfaces 52a with the inner surface of side wall 46.

Bounce back or return movement of sections 20 and 22 from their contracted position shown in FIG. 3 under the effect of increased air pressure within the reduced volume of space 24 is prevented by engagement of latch surfaces 76a with latch surface 42b. Leakage of liquid between guide tube 26 and discharge tube 28 is prevented by the interference fit between guide tube surface 60 and outer guide surface 88d. When it is deemed that sufficient time has elapsed to effect transfer of all or a sufficient portion of the liquid charge from device 10 to tree 12, the device is pulled from within bore opening 14, the bore opening suitably patched to prevent entry of insects into the tree, and the device safely disposed of. The interference fit provided between guide tube surface and outer guide surface 88d, combined with the tight fit of second retaining recess 88b with annular rib 62, prevents discharge tube 28 from being pulled from within guide tube 28 when force is applied to device 10 sufficient to withdraw the discharge tube from within bore 14.

An alternate form of device 10 is shown in part in FIG. 6. This form of the invention differs from that described with reference to FIGS. 1-5 only in that a frangible seal, such as may be defined by a disc 100 is arranged to extend transversely within outer container section 20 such that space 24 is divided into separate and isolated volumes 24a and 24b for receiving a liquid and a chemically dissimilar material intended to be mixed with the liquid prior to discharge of the liquid through discharge tube 28. The chemically dissimilar material may be a liquid or solid depending upon the plant treatment desired to be effected. Disc 100 may, as desired, be suitably bonded to latch surface 46b or simply sized as shown in FIG. 6, to create an interference fit with the inwardly facing annular surface 42d of rim 42a leading to the latch surface. A device formed in accordance with FIG. 6 is assembled in the same manner as previously described, except that disc 100 is applied to latch surface 42b after either the liquid or dissimilar material is introduced into volume 24a and the other of the liquid or dissimilar material is introduced into volume 24b before mounting surfaces 42c and 48 are bonded together.

The mode of operation of the form of device 10 shown in FIG. 6 is also similar to that previously described, except that it would normally be preferable to thoroughly mix the contents of volumes 24a and 24b prior to the rupture of seal member 30, i.e. unseating such seal member from seat 50a. This may be accomplished by holding side wall 46 with one hand and applying pressure to end wall 64 with the opposite hand sufficiently to move container sections 20 and 22 into their contracted position. As an incident to such movement, cam/piercing edges 78a first engage and then pierce disc 100 to form a plurality of annularly spaced slot openings therein in order to place volumes 24a and 24b in flow communication. For certain types of disc forming materials, which may have a tendency to stretch upon initial engagement by edges 78a, such edges may cooperate with cam surfaces 52a to form the slot openings by means of a shearing action or free edges 52b of such cam surfaces simply serve to constrain further movement of the disc while same is pierced by edges 78a. In any event, after initial formation of the slot openings in disc 100, the sliding engagement of edges 78a with cam surfaces 52a causes piercing elements 78 to progressively flex radially outwardly relative to disc 100, until such time as latching surfaces 76a are disposed in operative alignment with latch surface 42b and move outwardly for latching purposes, thereby causing the piercing elements to progressively enlarge the slot openings. In the specific arrangement shown in FIG. 6, latching surfaces 76a will actually engage with the surface of disc 100 for latching proposes, but will actually latch relative to latch surface 42a to which the periphery of the disc is fixed. After sections 20 and 22 have been moved into their contracted position, discharge tube 28 is inserted into the tree and a sufficient force applied to end wall 68 and/or against rim 42a to effect relative movement of the discharge tube into its device dispensing position.

What is claimed is:

1. In a plant injection device of the type having a pair of telescopically associated, relatively inner and outer container sections cooperating to define a liquid and gas receiving interior space whose volume is varied by relative axial movement of said sections between extended and contracted positions for expelling said liquid therefrom through a liquid discharge tube carried by said liquid therefrom through a liquid discharge tube carried by said outer section, the improvement comprising in combination;

said outer section includes an open end portion for mounting said inner section and an opposite end portion for mounting said discharge tube, said open end portion including a side wall having an inner bearing surface, a first open end through which said inner section extends and a second open end connected to said opposite end portion and defining a latch surface extending outwardly from said bearing surface and facing away from said first open end;

said inner section includes a side wall supported for sliding movement by and in liquid sealed engagement with said side wall of said open end portion, a closed end and an open end said open end of said inner section having a resiliently deformable latch means arranged for sliding engagement with said bearing surface during movement of said sections from said extended position towards said contracted position, said latch means being resiliently deformed by said bearing surface during said movement to create a bias for moving said latch means outwardly beyond said bearing surface for snap fit engagement with said latch surface upon movement of said sections into said contracted position for preventing return thereof to said extended position; and a frangible seal fixed transversely with said outer section and dividing said outer section into separate volumes for receiving said liquid and gas and a chemically dissimilar material intended to be mixed with said liquid prior to discharge of said liquid through said discharge tube, and said inner section carries piercing means for creating at least one opening in said seal to place said volumes in flow communication upon movement of said sections from said extended position into said contracted position.

2. The improvement according to claim 1, wherein said latch means is formed of a resiliently deformable plastic material tending to be subject to setting in a deformed state when maintained in said deformed state for a period of time corresponding to a shelf life of said liquid, said bearing surface has a recess opening inwardly therethrough and arranged relatively adjacent said first open end for receiving said latch means, whereby said latch means resides in our essentially nondeformed state when said sections are disposed in said extended position.

3. The improvement according to claim 1, wherein said opposite end portion includes cam surface means arranged in facing relation to and immediately adjacent to said seal and said piercing means is arranged to engage with said cam surface means upon piercing of said seal, and said cam surface means upon engagement thereof by said piercing means forces said piercing means to move transversely of said outer section to progressively enlarge said opening as an incident to movement of said sections into said contracted position.

4. The improvement according to claim 3, wherein said piercing means is carried by said latch means.

5. In a plant injection device of the type having a pair of telescopically associated, relatively inner and outer container sections cooperating to define a liquid and gas receiving interior space whose volume is varied by relative axial movement of said sections between extended and contracted positions for expelling said liquid therefrom through a liquid discharge tube carried by said outer section, the improvement comprising in combination;

said outer section includes an open portion for mounting said inner section and an opposite end portion for mounting said discharge tube, said open end portion including a side wall having an inner bearing surface, a first open end through which said inner section extends and a second open end connected to said opposite end portion and defining a latch surface extending outwardly from said bearing surface and facing away from said first open end, said opposite end portion includes a guide tube having inner and outer ends, an inwardly facing guide surface and an annular rib extending inwardly of said guide surface intermediate said inner and outer ends, and a sealing member carried adjacent said inner end, said discharge tube includes liquid intake and discharge ends and is slidably insertable within said guide tube to move said intake end from a device charged position to a device dispensing position incident to which said intake end engages with and effects rupture of said sealing member to place said discharge end in flow communication with said interior space, said discharge tube includes first and second annular, outwardly opening retaining recesses for alternatively receiving said annular rib to define said device charged position and said device dispensing position, respectively, radially through slots extending from said intake end to a point adjacent said second retaining recess, a first outer guide surface extending from said intake end to said second retaining recess and a second outer guide surface extending from said second retaining recess towards said discharge end, said first guide surface having a diameter no greater than the diameter of said inwardly facing guide surface and said second guide surface having a diameter sized to create an interference sliding fit with said inwardly facing guide surface, and said inner section includes a side wall supported for sliding movement by and in liquid sealed engagement with said side wall of said open end portion, a closed end and an open end, said open end of said inner section having a resiliently deformable latch means arranged for sliding engagement with said bearing surface during movement of said sections from said extended position towards said contracted position said latch means resiliently deformed by said surface during said movement to create a bias for moving said latch means outwardly beyond said bearing surface for snap fit engagement with said latch surface upon movement of said sections into said contracted position for preventing return thereof to said extended position.

6. In a plant injection device of the type having a pair of telescopically associated, relatively inner and outer container sections cooperating to define a liquid receiving interior space whose volume is varied by relative axial movement of said sections between extended and contracted positions for expelling said liquid therefrom through a liquid discharge tube carried by said outer section, the improvement comprising in combination;

said outer section includes an open end portion for mounting said inner section and an opposite end portion for mounting said discharge tube, said open end portion including a side wall having an inner bearing surface, a first open end through which said inner section extends and a second open end connected to said opposite end portion and defining a latch surface extending outwardly from said bearing surface and facing away from said first open end, said opposite end portion carries cam surface means arranged to face towards said latch surface; and said inner section includes a side wall supported for sliding movement by and in liquid sealed engagement with said inner bearing surface, said side wall of said inner section having an open end received within said outer section and having a latch means mounted thereon mounting thereon latch means, and said latch means is arranged to engage with said cam surface means incident to said movement of said sections into said contracted position to effect camming displacement of said latch means outwardly into engagement with said latch surface for subsequently preventing return of said sections to said extended position.

7. The improvement according to claim 6, wherein said latch means is formed of a resiliently deformable plastic material tending to be subject to setting in a deformed state when maintained in said deformed state for a period of time corresponding to a shelf life of said liquid, said bearing surface has a recess opening inwardly therethrough and arranged relatively adjacent said first open end for receiving said latch means, whereby said latch means resides in an essentially non-deformed state when said section are disposed in said extended position.

8. The improvement according to claim 6, wherein a frangible seal is fixed to said latch surface to extend transversely within said outer section for dividing said space into separate volumes for receiving said liquid and a chemically dissimilar material intended to be mixed with said liquid prior to discharge of said liquid through said discharge tube, and said latch means carries piercing means for creating at least one opening in said seal to place said volumes in flow communication upon movement of said sections from said extended position into said contracted position, and said cam surface means causes said piercing means to move transversely of said outer section to progressively enlarge said opening as an incident to movement of said sections into said contracted position.

9. The improvement according to claim 8, wherein said outer section includes a guide tube having inner and outer ends, an inwardly facing guide surface, and an annular rib extending inwardly of said guide surface intermediate said inner and outer ends, and a sealing member carried adjacent said inner end, said discharge tube includes liquid intake and discharge ends and is slidably insertable within said guide tube to move said intake end from a device charged position to a device dispensing position incident to which said intake end engages with and effects rupture of said sealing member to place said discharge end in flow communication with said interior space, said discharge tube includes first and second annular, outwardly opening retaining recesses for alternatively receiving said annular rib to define said device charged position and said device dispensing position, respectively, radially through slots extending from said intake end to a point adjacent said second retaining recess, a first outer guide surface extending from said intake end to said second retaining recess and a second outer guide surface extending from said second retaining recess towards said discharge end, said first guide surface having a diameter no greater than the diameter of said inwardly facing guide surface and said second guide surface having a diameter sized to create an interference sliding fit with said inwardly facing guide surface.

10. The improvement according to claim 6, wherein said outer section includes a guide tube having inner and outer ends, an inwardly facing guide surface and an annular rib extending inwardly of said guide surface intermediate said inner and outer ends, and a sealing member carried adjacent said inner end, said discharge tube includes liquid intake and discharge ends and is slidably insertable within said guide tube to move said intake end from a device charged position to a device dispensing position incident to which said intake end engages with and effects rupture of said sealing member to place said discharge end in flow communication with said interior space, said discharge tube includes first and second annular, outwardly opening retaining recesses for alternatively receiving said annular rib to define said device charged position and said device dispensing position, respectively, radially through slots extending from said intake end to a point adjacent said second retaining recess, a first outer guide surface extending from said intake end to said second retaining recess and a second outer guide surface extending from said second retaining recess towards said discharge end, said first guide surface having a diameter no greater than the diameter of said inwardly facing guide surface and said second guide surface having a diameter sized to create an interference sliding fit with said inwardly facing guide surface.

11. A device for injecting a quantity of liquid into a plant, said device comprising:
- a pair of telescopically associated container sections, one of said sections having an open end portion for supporting the other of said inner sections, an opposite end portion having a guide tube formed with outer and inner ends and a guide surface, and a sealing member arranged adjacent said inner end, said open end portion defining an annular latch surface facing in the direction of said guide tube;
- a seal fixed to extend transversely within said one of said sections and cooperating with said opposite end portion and said seal member to bound a volume; and
- a discharge tube having liquid intake and discharge ends and being slidably mounted by said guide surface for movement from a device charged position towards a device dispensing position incident to which said intake end engages with and effects rupture of said sealing member, said other of said sections cooperates with said open end portion and said seal to bound another volume, one of said volume and said other volume containing a liquid and the other of said volume and said other volume containing a material to be mixed with said liquid prior to discharge through said disclosure tube upon rupture of said sealing member, said other of said sections being supported by said open end portion for movement between extended and contracted positions, and said other of said sections has piercing means engagable with said seal to create at least one opening in said seal to place said volume and said other volume in flow communication incident to movement of said other of said sections into said contracted position and latch means cooperating with said annular latch surface to latch said other of said sections in said contracted position.

12. The improvement according to claim 11, wherein said guide tube has a rib projecting from said guide surface, said discharge tube includes first and second retaining recesses for alternatively receiving said rib to define said device charged position and said device dispensing position, respectively, a first guide surface extending from said intake end to said second retaining recess and a second outer guide surface extending from said second retaining recess towards said discharge end, said first guide surface being freely slidably received by said guide surface and said second guide surface having a diameter sized to create an interference sliding fit with said guide surface.

13. The improvement according to claim 12, wherein said opposite end portion defines an annular seat arranged adjacent said inner end of said guide tube, said sealing member is a disc supported by said seat, said intake end displaces said disc from said seat to effect said rupture thereof, and said discharge tube has radially through slot extending from said intake end to a point adjacent said second retaining recess.

14. The improvement according to claim 11, wherein said opposite end portion defines cam surface means arranged for cooperation with said piercing means to move said piercing means transversely of said opposite end portion to enlarge said opening.

15. In a plant injection device of the type having a pair of telescopically associated container sections cooperating to define a liquid receiving interior space whose volume is varied by relative axial movement of said sections between extended and contracted positions for expelling said liquid therefrom through a liquid discharge tube carried by one of said sections, the improvement comprising in combination;
- said one of said sections includes an open end portion for mounting the other of said sections and an opposite end portion for mounting said discharge tube, said open end portion including a side wall having a bearing surface, a first open end and a second open end connected to said opposite end portion and defining a latch surface facing away from said first open end, said opposite end portion carries cam surface means arranged to face towards said latch surface; and
- said other of said sections includes a side wall supported for sliding movement by and in liquid sealed engagement with said bearing surface and latch means arranged to engage with said cam surface means incident to said movement of said sections into said contracted position to effect camming displacement of said latch means into engagement with said latch surface for subsequently preventing return of said sections to said extended position.

16. The improvement according to claim 15, wherein said one of said sections carries a seal for dividing said space into separate volumes for receiving said liquid and a chemically dissimilar material intended to be mixed with said liquid prior to discharge of said liquid through said discharge tube, and said latch means carries piercing means for creating at least one opening in said seal to place said volumes in flow communication upon movement of said sections from said extended position into said contracted position.

17. The improvement according to claim 16, wherein said opposite end portion includes a sealing member for blocking flow communication between one of said volumes, and said discharge tube is mounted for movement relative to said opposite end portion to rupture said sealing member.

* * * * *